(12) United States Patent
Luffel et al.

(10) Patent No.: US 6,266,316 B1
(45) Date of Patent: Jul. 24, 2001

(54) AUTOMATIC SPLAYING PICKER FINGER

(75) Inventors: Robert Wesley Luffel, Greeley; Paul Clinton Coffin; Robert Lee Mueller, both of Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/259,573

(22) Filed: Mar. 1, 1999

(51) Int. Cl.$^7$ ................................................. G11B 15/68
(52) U.S. Cl. ............................................... 369/178; 360/92
(58) Field of Search ..................... 369/176, 178, 369/191, 192, 36; 360/92; 414/281, 283

(56) References Cited

U.S. PATENT DOCUMENTS

| | | | |
|---|---|---|---|
| 4,742,504 | | 5/1988 | Takasuka et al. .................. 369/36 |
| 4,918,548 | | 4/1990 | O'Donnell et al. ................ 360/92 |
| 4,998,232 | | 3/1991 | Methlie et al. .................... 369/36 |
| 5,010,536 | | 4/1991 | Wanger et al. .................... 369/36 |
| 5,014,255 | | 5/1991 | Wanger et al. .................... 369/36 |
| 5,040,159 | * | 8/1991 | Oliver et al. ...................... 369/34 |
| 5,043,962 | | 8/1991 | Wanger et al. .................... 369/36 |
| 5,101,387 | * | 3/1992 | Wanger et al. .................... 369/36 |
| 5,133,632 | * | 7/1992 | Aramaki et al. .................. 414/283 |
| 5,146,375 | | 9/1992 | Satoh et al. ....................... 360/92 |
| 5,277,534 | * | 1/1994 | Anderson et al. ................ 414/281 |
| 5,417,543 | * | 5/1995 | Focke et al. .................... 414/796.9 |
| 5,471,561 | * | 11/1995 | Cowgill et al. .................... 395/82 |
| 5,515,356 | * | 5/1996 | Lee .................................. 369/178 |
| 5,570,337 | * | 10/1996 | Dang ............................... 369/192 |
| 5,596,556 | | 1/1997 | Luffel et al. ...................... 369/36 |
| 5,638,349 | | 6/1997 | Rugg et al. ....................... 369/36 |
| 5,687,039 | | 11/1997 | Coffin et al. ...................... 360/92 |
| 5,742,570 | * | 4/1998 | Taki et al. ......................... 369/36 |
| 5,760,995 | * | 6/1998 | Heller et al. ...................... 360/92 |
| 5,761,161 | * | 6/1998 | Gallo et al. ....................... 369/36 |
| 5,764,615 | * | 6/1998 | Ware et al. ...................... 369/178 |
| 5,781,517 | * | 7/1998 | Nakajima ......................... 369/38 |
| 5,790,338 | * | 8/1998 | Kanai et al. ...................... 360/71 |
| 5,808,828 | * | 9/1998 | Forrer et al. ...................... 360/92 |
| 5,813,817 | * | 9/1998 | Matsumiya et al. .............. 414/280 |
| 5,966,366 | * | 10/1999 | Pollard ............................ 369/178 |
| 5,970,041 | * | 10/1999 | Inatani et al. ................... 369/192 |
| 6,005,745 | * | 12/1999 | Filkins et al. ..................... 360/92 |
| 6,104,693 | * | 8/2000 | Coffin et al. .................... 369/178 |

FOREIGN PATENT DOCUMENTS

0805444-A1 * 5/1997 (EP) .

OTHER PUBLICATIONS

United States Patent Ser. No. 09/045,134, filed Mar. 20, 1998 for "Multi–Plane Translating Cartridge Handling System" of Schmidtke et al.
United States Patent Ser. No. 09/045,558, filed Mar. 20, 1998 for "Cartridge Picker Assembly with Rack Drive Thumb Activator System" of Coffin, et al.
United States Patent Ser. No. 09/137,350, filed Aug. 20, 1998 for "Modular Data Storage System" of Joseph White, et al.

\* cited by examiner

*Primary Examiner*—David L. Ometz
*Assistant Examiner*—Franklin D. Altman

(57) ABSTRACT

A cartridge picker for selectively engaging and disengaging a cartridge may comprise a thumb assembly mounted to the cartridge picker so that the thumb assembly is moveable along a first displacement path between an extended position and a retracted position. An automatically splaying picker finger having an engagement end and a mounting end is mounted to the thumb assembly at the mounting end and is moveable between a retracted position and a splayed position, so that the finger moves into the splayed position when the engagement end is moved against a cartridge. A cartridge picker positioning system is operatively associated with the cartridge picker to move the cartridge picker between a first position and a second position along a second displacement path that is substantially perpendicular to the first displacement path. The finger disengages the cartridge when the thumb assembly is in the extended position and the cartridge picker is moved to the second position.

14 Claims, 15 Drawing Sheets

AUTOMATIC SPLAYING PICKER FINGER

FIELD OF INVENTION

This invention relates generally to data storage systems for handling and storing data cartridges, such as optical disk or magnetic tape cartridges, and more specifically to cartridge access devices for engaging and retrieving the data cartridges stored in data storage systems.

BACKGROUND

Many different types of data storage systems exist and are being used to store data cartridges at known locations and to retrieve desired data cartridges so that data may be written to or read from the data cartridges. Such data storage systems are often referred to as "juke box" data storage systems, particularly if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are often arranged so that they form one or more vertical stacks, although other configurations are possible. The cartridge read/write device may be located at any convenient location within the data storage system.

The data storage system may also be provided with a moveable cartridge picker assembly or simply "picker" for transporting the data cartridges between the various cartridge receiving devices, e.g., between the cartridge storage racks and the cartridge read/write devices. A typical picker may also be provided with a cartridge plunge mechanism or "thumb" assembly for engaging the various data cartridges contained in the cartridge receiving devices and for drawing them into the picker. A picker positioning system associated with the cartridge picker assembly may be used to move the cartridge picker assembly along the various cartridge receiving devices.

Data storage systems of the type described above are usually connected to a host computer system which may be used to access or store data on the data cartridges. For example, if the host computer system issues a request for data contained on a particular data cartridge, a control system associated with the data storage system will actuate the picker positioning system to move the picker assembly along the cartridge storage racks until the picker assembly is positioned adjacent the desired data cartridge. The cartridge plunge mechanism or "thumb" assembly associated with the picker assembly may then remove the data cartridge from the cartridge storage rack and draw it into the picker assembly. The picker positioning system may then be actuated to move the picker assembly to the appropriate cartridge read/write device. Once properly positioned adjacent the cartridge read/write device, the thumb assembly may insert the selected data cartridge into the cartridge read/write device so that the host computer may thereafter read data from or write data to the data cartridge. After the read/write operation is complete, the thumb assembly may be actuated to remove the data cartridge from the cartridge read/write device. The picker assembly may thereafter return the data cartridge to the appropriate location in the cartridge storage rack.

A typical cartridge plunge mechanism or "thumb" assembly is usually slidably mounted to the picker and is provided with a thumb actuator system to move the thumb assembly toward and away from a cartridge access end of the picker. For example, if it is desired to retrieve a data cartridge from a cartridge receiving device, the thumb actuator system moves the thumb assembly toward the cartridge access end of the picker so that the thumb assembly can engage or "grab" the data cartridge. Thereafter, the thumb actuator system may retract the thumb assembly and engaged data cartridge into the picker. If it is desired to load the data cartridge into the cartridge receiving device, then the thumb actuator moves the thumb assembly and data cartridge toward the cartridge access end of the picker, and inserts the data cartridge into the cartridge receiving device.

The thumb assembly may utilize any of a wide variety of devices to allow the thumb assembly to transfer the cartridge between the cartridge picker assembly and a cartridge receiving device. For example, one type of cartridge engaging device comprises a plurality of jaw members which grip the sides of a cartridge. In this system, the jaws maintain their hold on a cartridge using friction. In order to reliably grip a cartridge, the jaws must be made of a material having a high coefficient of friction with the data cartridge. This requirement may necessitate the use of relatively expensive materials for the jaws or the use of multiple materials such as a rigid plastic core and a rubber coating. The jaws also tend to be bulky due to the strength requirements in a friction system. This results in relatively large gaps between cartridges to allow the jaws to reach in between adjacent cartridges. Furthermore, the jaws must clamp firmly around the data cartridge, requiring a bulky actuator system.

Another type of cartridge engaging device may comprise a latch member of "finger" having a hooked end to engage in a notch in the side of a data cartridge. Currently known finger systems require the use of a track on the inside of the picker frame to cause the finger to splay down below the side of a data cartridge as the thumb and finger assemblies are moved toward the cartridge.

Once the finger has moved past the face of the cartridge and cleared the edge, the track allows the finger to move up toward the side of the cartridge under the tension of a spring. When the hooked end of the finger moves over the notch in the side of the cartridge, the spring pulls the hooked end of the finger up into the notch, allowing the thumb assembly to thereafter retract and pull the cartridge into the picker. In order to insert the cartridge into a cartridge receiving device, the thumb assembly pushes the cartridge, with the finger still engaged, into the device. A gate on the inside of the picker frame then causes the finger to splay away from the cartridge, disengaging the hooked end of the finger from the notch in the side of the cartridge, before the thumb assembly and finger can retract and leave the cartridge in the device.

Finger assemblies of the type described above have several advantages over friction jaws, such as needing only one finger rather than multiple jaws. The finger may also be made of inexpensive plastic, as the strength and coefficient of friction requirements are much lower. A finger assembly is also less prone to inadvertently disengage from the cartridge, as the positive engagement of the hooked end in the notch is more secure than a friction grip on the sides of a cartridge.

However, the track and gate system that is required to move the finger away from the cartridge adds complexity to the picker frame. The additional parts required add to the size and cost of the picker and lower reliability. Furthermore, if the gate malfunctions and the finger disengages from the cartridge, error recovery can be difficult if the cartridge is dropped before it is correctly placed in a cartridge receiving device.

Consequently, a need exists for an improved finger assembly to engage a data cartridge. In particular, a need exists for a finger assembly which can more easily be splayed away from the data cartridge using fewer and less expensive components.

SUMMARY OF THE INVENTION

A cartridge picker for selectively engaging and disengaging a cartridge may comprise a thumb assembly mounted to said cartridge picker so that said thumb assembly is moveable along a first displacement path between an extended position and a retracted position. An automatically splaying picker finger having an engagement end and a mounting end is mounted to the thumb assembly at the mounting end and is moveable between a retracted position and a splayed position, so that said finger moves into the splayed position when the engagement end is moved against a cartridge. A cartridge picker positioning system is operatively associated with the cartridge picker to move the cartridge picker between a first position and a second position along a second displacement path that is substantially perpendicular to the first displacement path. The finger disengages the cartridge when the thumb assembly is in the extended position and the cartridge picker is moved to the second position.

Also disclosed is a cartridge picker for selectively engaging and disengaging a cartridge which may comprise a thumb assembly mounted to said cartridge picker so that said thumb assembly is moveable along a horizontal displacement path between an extended position and a retracted position. An automatically splaying picker finger having an engagement end and a mounting end is mounted to the thumb assembly at the mounting end and is moveable between a retracted position and a splayed position, so that said finger moves into the splayed position when the engagement end is moved against a cartridge. A cartridge picker positioning system is operatively associated with the cartridge picker to move the cartridge picker between a first position and a second position along a vertical displacement path that is substantially perpendicular to the horizontal displacement path. The finger disengages the cartridge when the thumb assembly is in the extended position and the cartridge picker is moved to the second position.

A method for engaging a data cartridge with a cartridge picker is also disclosed. A cartridge picker is provided comprising a thumb assembly moveable along a displacement path between an extended position and a retracted position and a finger mounted to the thumb assembly so that the finger may be moved between a retracted position and a splayed position. The cartridge picker is positioned adjacent the data cartridge, and the thumb assembly is moved along the displacement path toward the cartridge until the finger contacts the data cartridge and begins moving to the splayed position. The movement of the thumb assembly is continued along the displacement path toward the cartridge until the finger engages the notch.

A method for disengaging a cartridge picker from a data cartridge may comprise providing a cartridge picker having a thumb assembly moveable along a first displacement path between an extended position and a retracted position and a finger mounted to the thumb assembly so that the finger may be moved between a retracted position and a splayed position. The cartridge picker is moveable along a second displacement path that is substantially perpendicular to the first displacement path. The finger is initially engaged in a notch in the data cartridge. The thumb assembly is moved along the first displacement path to the extended position, and the cartridge picker is moved along the second displacement path until the finger is free of the notch in the data cartridge.

A method for disengaging a cartridge picker from a data cartridge in a cartridge receiving device may comprise providing a cartridge picker having a thumb assembly moveable along a displacement path between an extended position and a retracted position. The cartridge picker also includes a finger mounted to the thumb assembly so that the finger may be moved between a retracted position and a splayed position. The cartridge receiving device includes a bezel. The cartridge picker is moved adjacent the cartridge receiving device, and the thumb assembly is moved along the displacement path toward the extended position until the finger contacts the bezel and begins moving to the splayed position. The movement of the thumb assembly along the displacement path is continued until the cartridge is inserted in the cartridge receiving device. The thumb assembly may then be moved back along the displacement path toward the retracted position.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
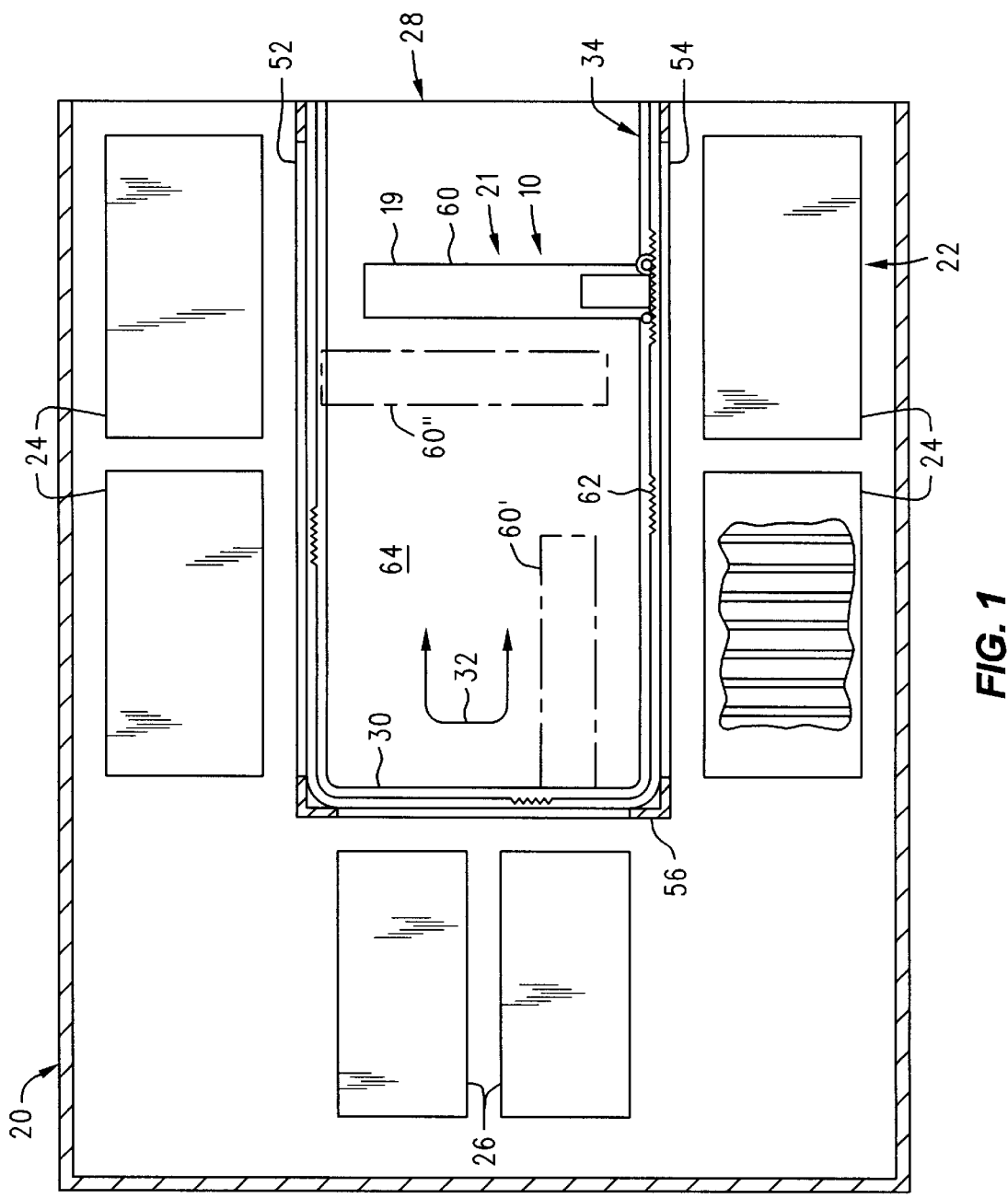
FIG. 1 is a plan view of a media access device and cartridge picker assembly as it may be used in a data storage system to access and transport data cartridges contained within the data storage system.

A cartridge picker assembly or "picker" 19 having an automatically splaying finger assembly 10 is shown in FIG. 1 as it could be used in a "juke box" data storage system 20 to transfer data cartridges 22 between one or more cartridge receiving devices, such as one or more cartridge storage racks or magazines 24 and one or more cartridge read/write devices 26.

Figure 8A:
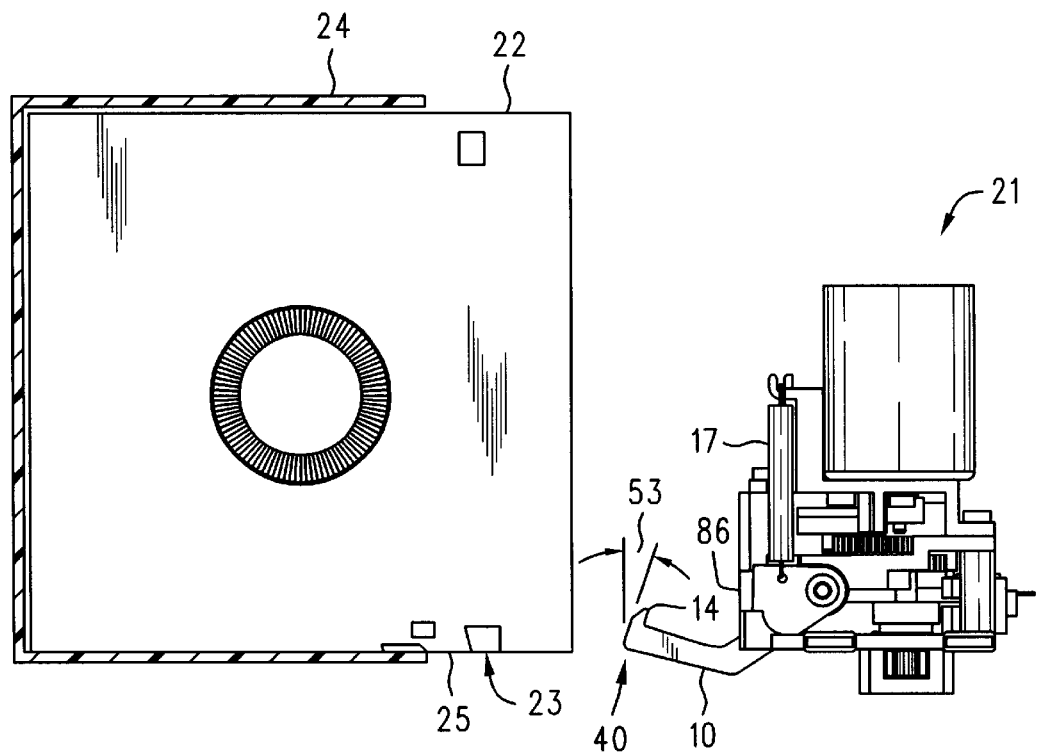
FIGS. 8(a–f) are elevation views of the thumb and finger assembly of FIGS. 7(a–f)

The automatically splaying finger assembly 10 may comprise a body 12 which is mounted at one end 51 to a cartridge plunge mechanism of "thumb assembly" 21. The automatically splaying finger assembly 10 further comprises an angled face surface 16 on the body 12 at the remote end 49 opposite the thumb assembly 21. The automatically splaying finger assembly 10 also comprises a hooked end or "tip" 14 which extends from the top 46 of the finger 10 near the remote end 49 and which is sized to fit within a notch 23 in a side edge 25 (FIG. 8a) of a data cartridge 22. A spring 17 may be attached between the automatically splaying finger assembly 10 and the thumb assembly 21 to pull the finger 10 into a retracted position 40 (FIG. 8a).

The automatically splaying finger assembly 10 is mounted to a thumb assembly 21 of the picker 19 and allows the thumb assembly 21 to engage and disengage a data cartridge 22. Because the automatically splaying finger assembly 10 is mounted to the thumb assembly 21, the thumb and finger assemblies 21 and 10 move toward and away from the cartridge end 36 of the picker 19 together. (see FIG. 5).

Figure 8B:
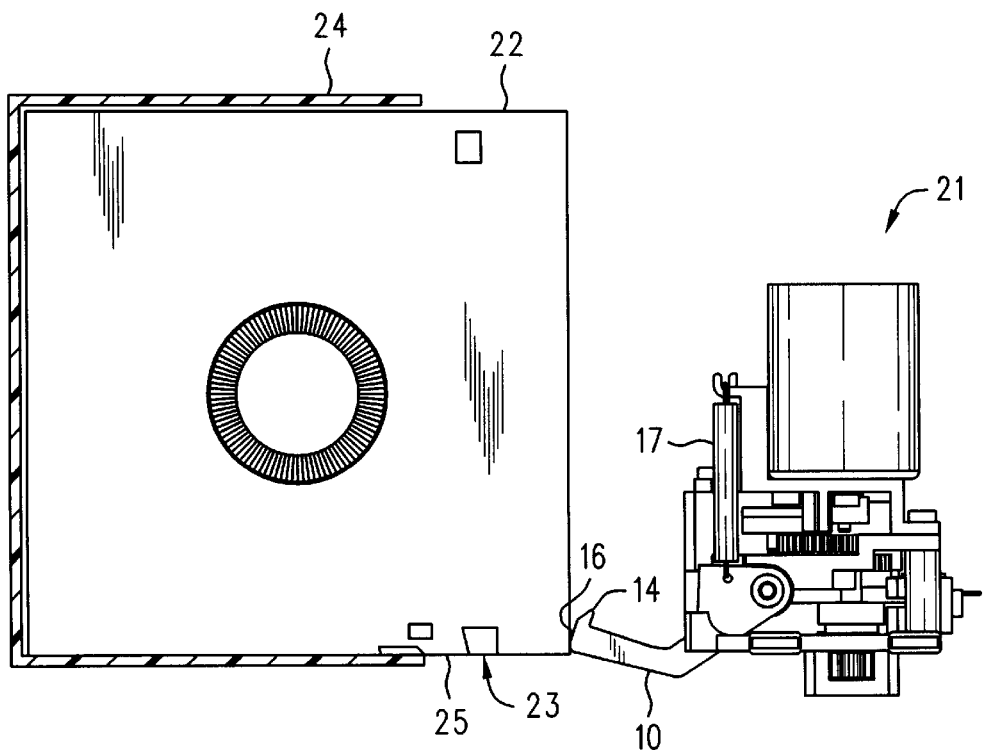
Figure 8C:
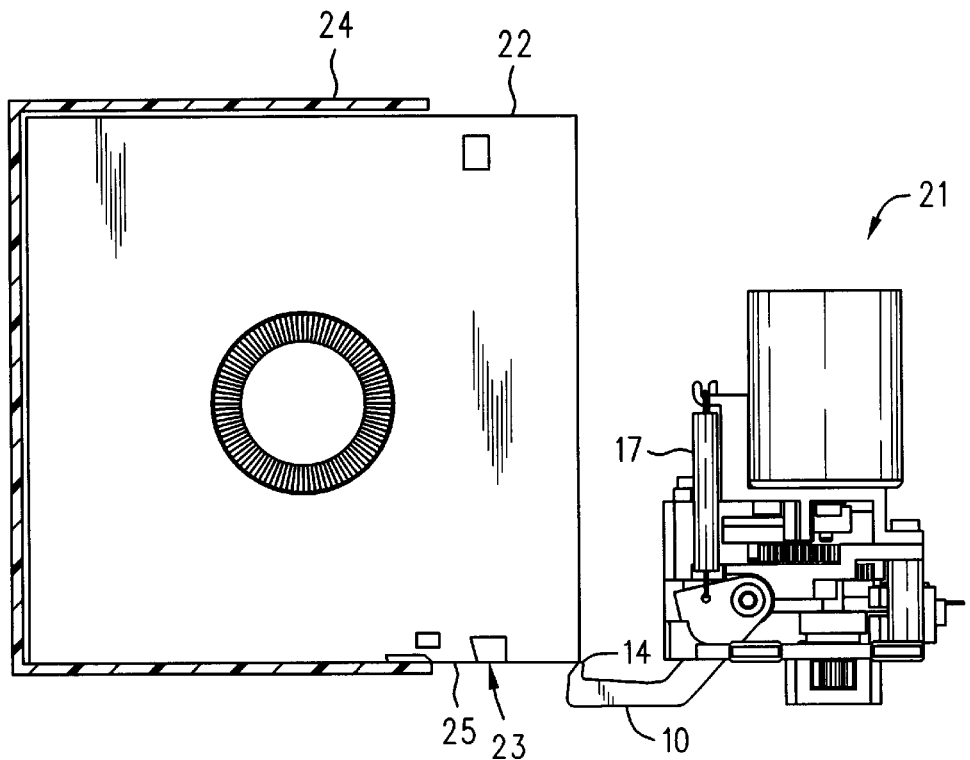
Figure 8D:
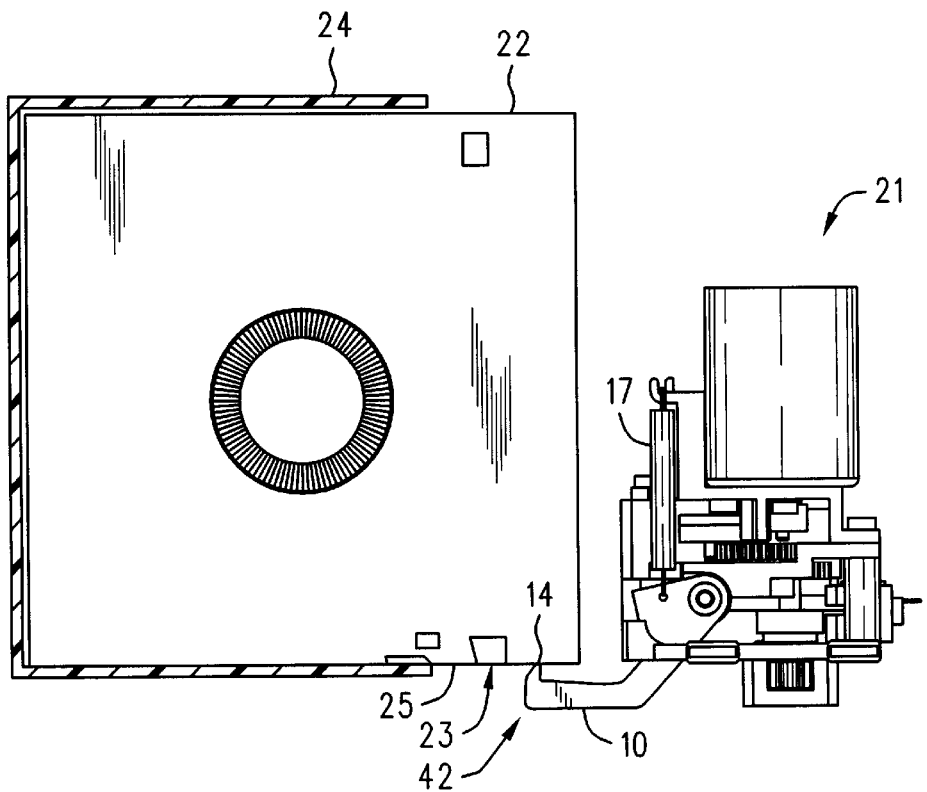

The automatically splaying finger assembly 10 may be moveably mounted to the thumb assembly 21, allowing the automatically splaying finger assembly 10 to move between a retracted position 40 (FIG. 8a) and a splayed position 42 on the thumb assembly 21 (FIG. 8d). In one preferred embodiment, the automatically splaying finger assembly 10 is pivotally mounted to the thumb assembly 21 by a pivot pin 18, allowing the automatically splaying finger assembly 10 to rotate between the retracted position 40 and the splayed position 42. The pivot pin 18 is higher than the contact point on the face 16 of the automatically splaying finger assembly 10 which first contacts a data cartridge 22.

The placement of the face 16 of the automatically splaying finger assembly 10 below the pivot pin 18 enables the automatic splaying of the finger 10, aided by the angled face 16 of the finger 10. As the thumb assembly 21 moves toward a surface such as a data cartridge 22, as shown in FIGS. 8b and 8c, the angled face 16 presses against the data cartridge 22, causing the automatically splaying finger assembly 10 to move downward into the splayed position 42 against the tension of the spring 17.

Figure 8E:
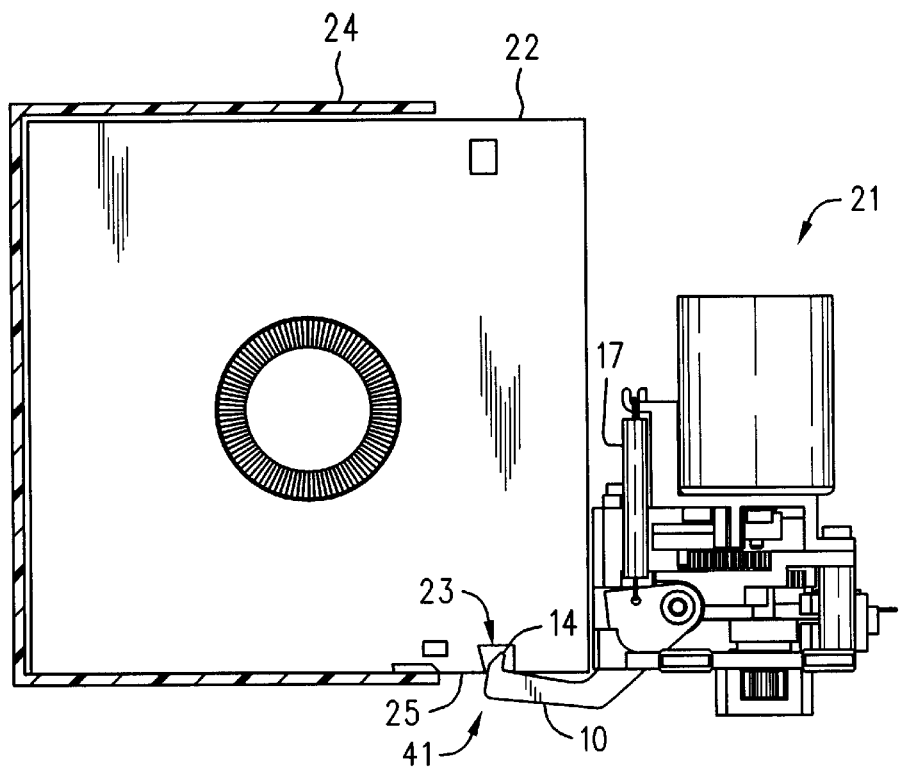

As the thumb assembly 21 continues to move toward the data cartridge 22, the tip 14 slides along the side edge 25 of the data cartridge 22 until it moves over the notch 23. The spring 17 then pulls the automatically splaying finger assembly 10 into a locked position 41 (FIG. 8e) with the tip 14 engaged in the notch 23. The tip 14 provides positive engagement against the notch, locking into the notch until the automatically splaying finger assembly 10 is moved away from the data cartridge 22.

With the automatically splaying finger assembly 10 engaged with the data cartridge 22, the thumb assembly 21 may then retract the cartridge 22 into the cartridge picker assembly 19, and the cartridge picker assembly 19 may transport the cartridge 22 to another cartridge receiving device.

Figure 11A:
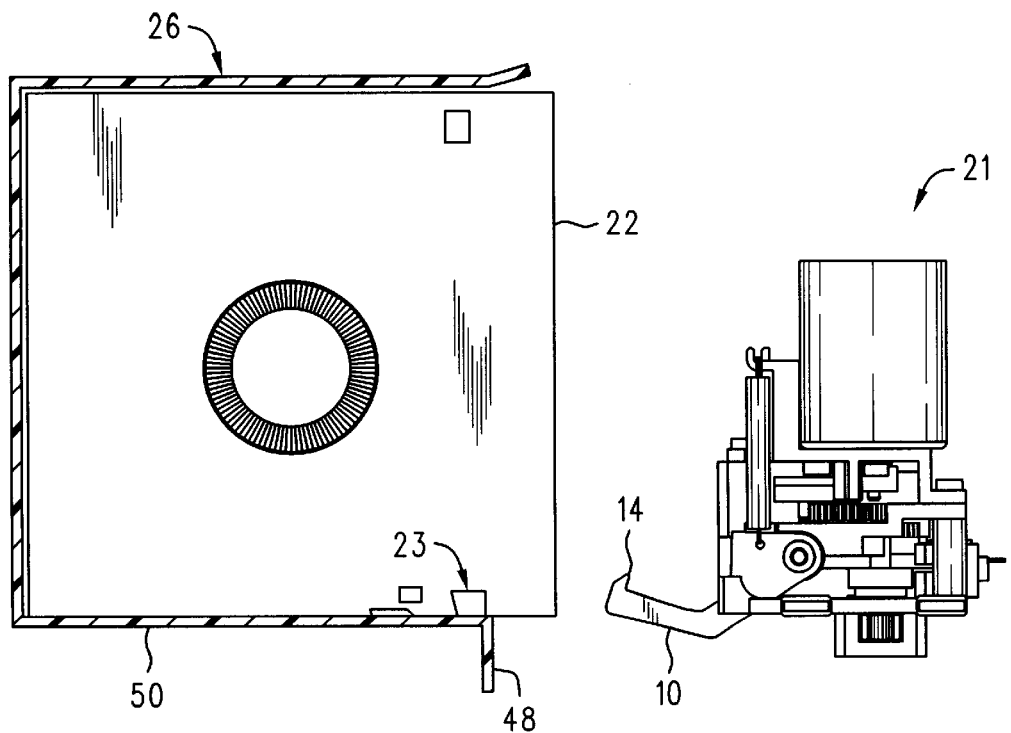
FIGS. 11(a–d) are elevation views of a thumb and finger assembly in various stages of engaging and disengaging a data cartridge in a cartridge read/write device.

To disengage the automatically splaying finger assembly 10 from the data cartridge 22 when it is inserted into a cartridge read/write device 26, the thumb assembly 21 first pushes the cartridge 22 into the read/write device 26. As the thumb assembly 21 and automatically splaying finger assembly 10 move toward the cartridge read/write device 26, the angled face 16 of the finger 10 contacts a bezel 48 on the drive housing 50 (FIG. 11a).

The engagement of the angled face 16 with the bezel 48 causes the automatically splaying finger assembly 10 to move to the splayed position 42. The thumb assembly 21 then continues to push the data cartridge 22 into the cartridge read/write device 26 until the notch 23 is fully covered by the cartridge read/write device 26, preventing the tip 14 from reentering the notch 23, as will be discussed in more detail hereinafter. The thumb assembly 21 may then be retracted, leaving the data cartridge 22 in the cartridge read/write device 26.

To disengage the automatically splaying finger assembly 10 from the data cartridge 22 when it is inserted into a cartridge storage rack 24, the data cartridge 22 is first fully inserted into the storage rack 24. In one preferred embodiment, the notch 23 remains accessible when the data cartridge 22 has been fully inserted into the storage rack 24. The cartridge picker assembly 19 is then moved with the thumb assembly 21 still in the extended position until the tip 14 of the automatically splaying finger assembly 10 is removed from the notch 23, leaving the data cartridge 22 in the storage rack 24, as will be discussed in more detail hereinafter. The thumb assembly 21 may then be retracted into the cartridge picker assembly 19.

The automatically splaying finger assembly 10 offers substantial advantages over friction engagement systems or track and gate finger assemblies. The automatically splaying finger assembly 10 is a simple, reliable, and cost effective system for engaging data cartridges 22, eliminating the costly and error-prone actuators required by prior cartridge engagement systems. The automatically splaying finger assembly 10 provides for improved operation by reducing the number of parts required and automating the splaying action of the finger 10. As a result, engagement of data cartridges (e.g., 22) with the cartridge picker assembly 19 is less error-prone, thereby improving the overall reliability of the juke-box data storage system 20. In addition, the size and cost of the cartridge picker assembly 19 is lowered.

The automatically splaying finger assembly 10 provides a positive engagement with a data cartridge (e.g., 22) which is much stronger than a friction hold. The automatically splaying finger assembly 10 has a lower profile than friction systems which require strong jaws, therefore data cartridges 22 may be placed more closely, reducing the size of the data storage system 20. Another benefit is that tolerance requirements are less restrictive than previous systems having a track and gate finger actuating system or friction jaws. Finally, error recovery is simplified since the automatically splaying finger assembly 10 is only splayed away from a cartridge 22 after it is been placed in a cartridge receiving device (e.g., 24 and 26).

Having briefly described the automatically splaying finger assembly 10, as well as some of its more significant features and advantages, the various embodiments of the automatically splaying finger assembly 10 according to the present invention will now be described in detail. However, before proceeding with the description, it should be noted that the automatically splaying finger assembly 10 according to the present invention may be utilized in any of a wide range of cartridge engaging assemblies in any of a wide variety of data storage systems now known or that may be developed in the future. Accordingly, the present invention should not be regarded as limited to the particular data storage system 20 and cartridge picker assembly 19 shown and described herein.

With the foregoing considerations in mind, one embodiment of an automatically splaying finger assembly 10 is shown and described herein as it may be used in a cartridge picker assembly 19. The cartridge picker assembly 19 may, in turn, be used in a portion of a "juke box" data storage system 20. In one preferred embodiment, the juke box data storage system 20 may comprise a data storage system of the type shown and described in U.S. patent application Ser. No. 09/045,134, filed Mar. 20, 1998, entitled "Multi-Plane Translating Cartridge Handling System," which is incorporated herein by reference for all that it discloses. Alternatively, the data storage system 20 may be of the type shown and described in U.S. Pat. No. 5,596,556, entitled "Linear Displacement and Support Apparatus for use in a Cartridge Handling System," which is also incorporated herein by reference for all that it discloses. The data storage system 20 may also be of the type shown and described in U.S. patent application Ser. No. 09/137,350, filed Aug. 20, 1998, entitled "Modular Data Storage System," which is incorporated herein by reference for all that it discloses.

Referring now primarily to FIG. 1, the data storage system 20 shown and described in U.S. patent application Ser. No. 09/045,134 referred to above may comprise a generally rectangularly shaped frame or chassis assembly 28 having a pair of opposed side portions 52 and 54 and an end portion 56 around which are positioned various cartridge receiving devices. More specifically, a pair of cartridge storage racks or magazines 24 may be positioned adjacent each opposed side portion 52 and 54 of the frame or chassis assembly 28, whereas a pair of cartridge read/write devices 26 may be positioned adjacent the end portion 56 of the frame assembly 28. Accordingly, the various cartridge receiving devices (e.g., the cartridge storage racks or magazines 24 and the cartridge read/write devices 26) define a generally U-shaped configuration.

A picker positioning system 34 may be used to move the cartridge picker assembly 19 along the U-shaped guide track 30. For example, in the embodiment shown and described herein, the picker positioning system 34 may move the cartridge picker assembly 19 between a first position 60 adjacent the first side portion 54 of the frame assembly 28, a second position 60' adjacent the end portion 56 of frame assembly 28, and a third position 60" adjacent the second side portion 52 of frame assembly 28.

The picker positioning system 34 may comprise a rack and pinion drive system having a U-shaped gear rack 62 mounted to the lower plate 64 of frame assembly 28 at a position adjacent the U-shaped guide track 30. The cartridge picker assembly 19 may be provided with a lower pinion gear 66 (FIG. 4) sized and positioned so that it will engage the lower U-shaped gear rack 62 provided on the lower plate 64. Similarly, the cartridge picker assembly 19 may also be provided with an upper pinion gear 68 sized and positioned so that it will engage an upper U-shaped gear rack provided on an upper plate 70 (not shown). A drive pinion actuator system 72 mounted to the cartridge picker assembly 19 may be used to drive the lower and upper pinion gears 66 and 68, thereby allowing the picker assembly 19 to be moved along the U-shaped path 32.

Figure 4:
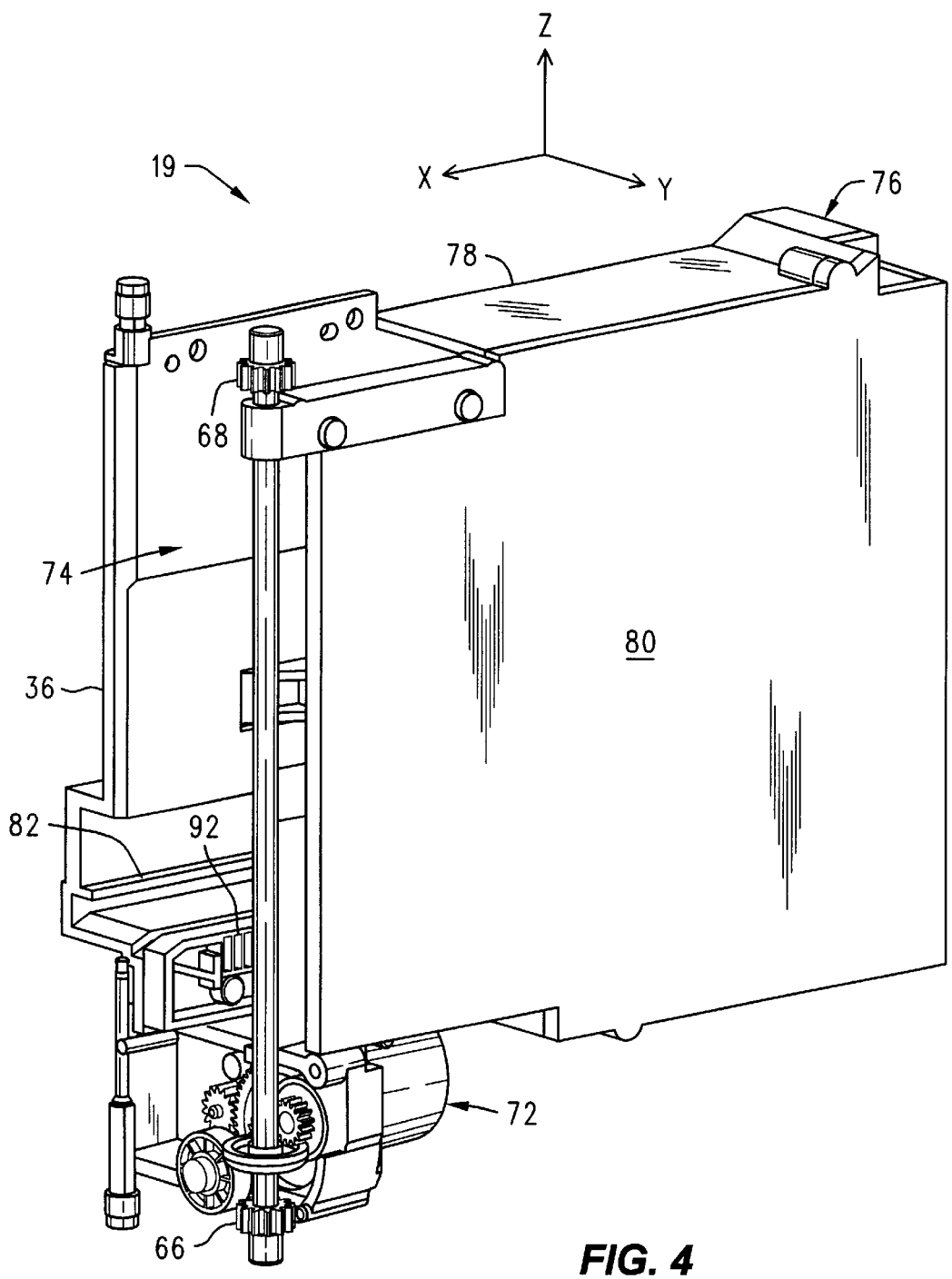
FIG. 4 is a perspective view of the cartridge picker assembly.
Figure 5:
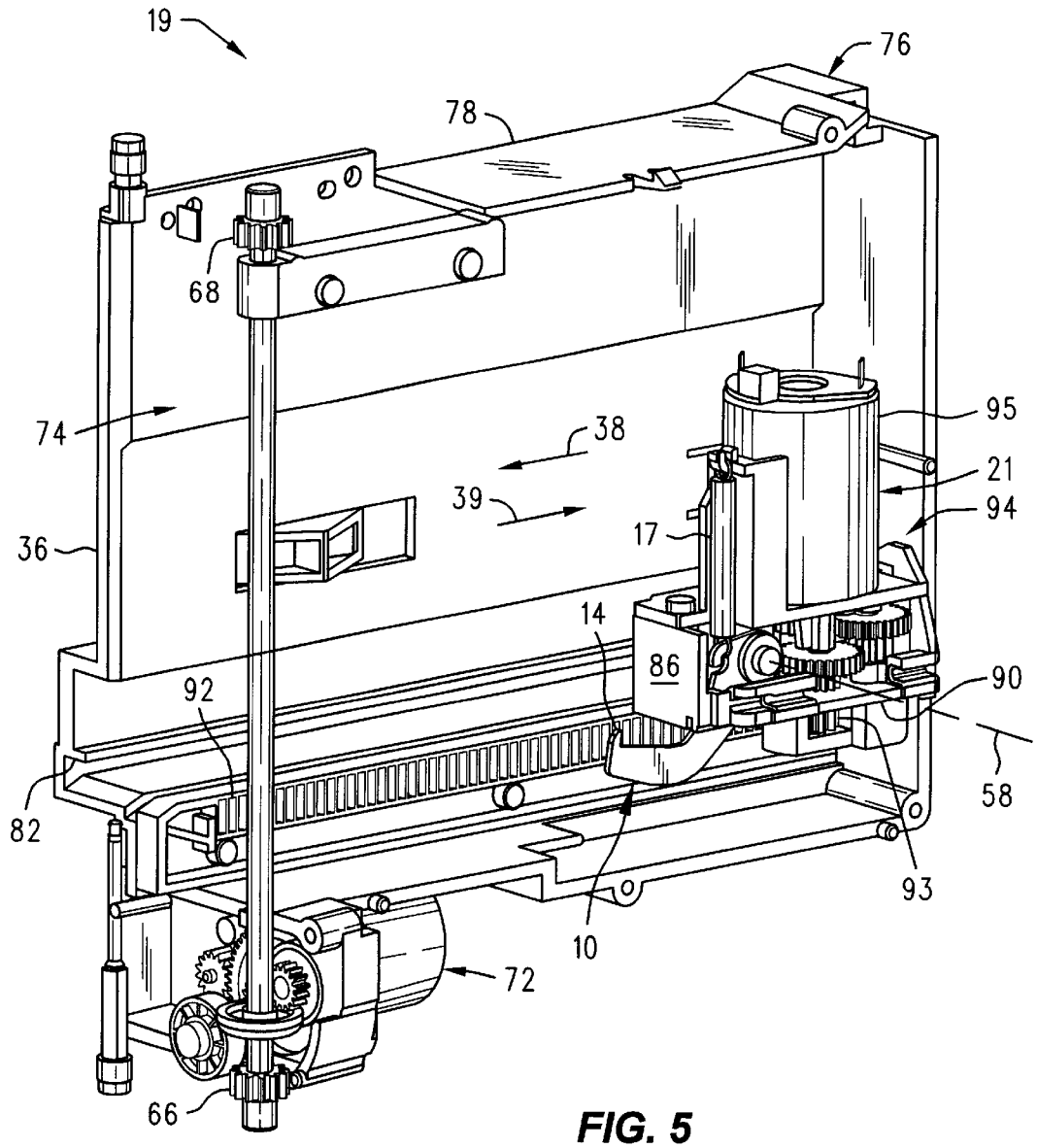
FIG. 5 is a perspective view of the left side of the cartridge picker assembly showing the thumb and finger assemblies.
Figure 6:
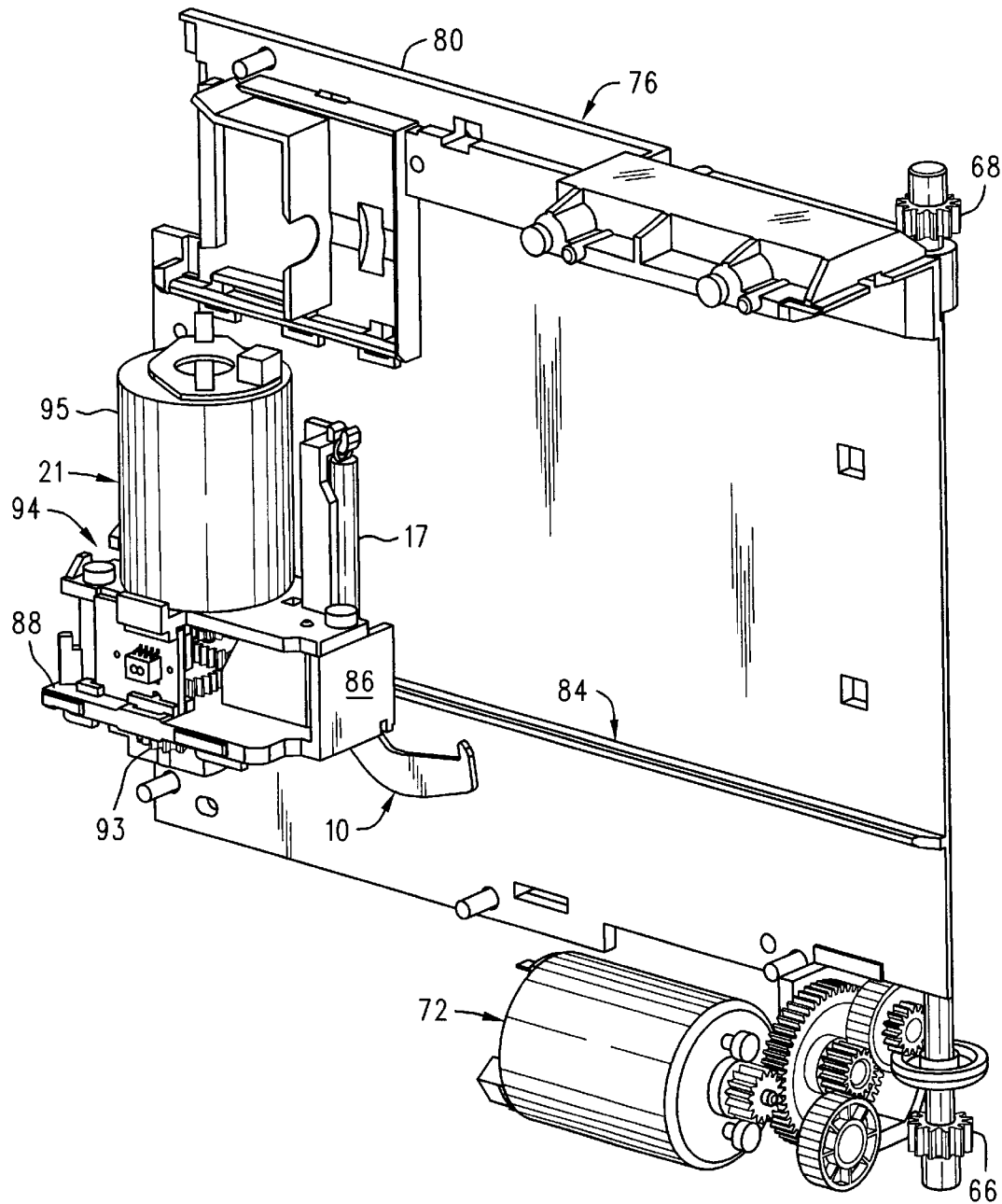
FIG. 6 is a perspective view of the right side of the cartridge picker assembly showing the thumb and finger assemblies.

The details of the cartridge picker assembly 19 that may be utilized in one preferred embodiment of the present invention are best seen in FIGS. 4–6. Essentially, the cartridge picker assembly 19 may include a picker frame assembly 76 having a first side wall or member 78 and a second side wall or member 80. The two side members 78 and 80 define an interior chamber or cavity 74 of sufficient size to receive a data cartridge 22. The thumb assembly 21 is slidably mounted to the frame assembly 76 so that the thumb assembly 21 may be moved along an X axis toward and away from the cartridge access end 36 of frame assembly 76, i.e., generally in the directions of arrows 38 and 39, respectively. (See FIG. 6)

The thumb assembly 21 may be mounted on first and second elongate guide rails 82 and 84 that are provided on the first and second sides 78 and 80 of the picker frame assembly 76. (See FIGS. 5 and 6) The main body portion 86 of the thumb assembly 21 may include a first flange member 88 sized and positioned to engage the first elongate guide rail 82. The main body portion 86 of the thumb assembly 21 may also include a second or C-shaped flange member 90 adapted to engage the second elongate guide rail 84. The thumb assembly 21 is thereby guided and supported as it is moved in the cartridge picker assembly 19 toward and away from the cartridge access end 36.

The various components just described may be made from any of a wide range of materials, such as metals or plastics, suitable for the intended application. For example, in one preferred embodiment, the first and second side members 78 and 80 comprising the picker frame assembly 76 are molded from a polycarbonate plastic material. Accordingly, the various components and features contained therein, e.g., the guide rails 82 and 84 may be provided as integral components of the respective side members 78 and 80. Alternatively, the first and second side members 78 and 80 comprising the picker frame assembly 76 may be made from other materials, in which case the various components and features of the side members 78 and 80 may comprise integral components or separate elements, depending on the particular design and material to be utilized.

The main body portion 86 of the thumb assembly 21 may also be made from any of a wide range of materials suitable for the intended application. For example, in the embodiment shown and described herein, the main body portion 86 of thumb assembly 21 is made from nylon with a small amount of Teflon® added (e.g., about 15% by weight) as a friction modifier, although other materials could also be used.

The thumb assembly 21 may be moved toward and away from the cartridge access end 36 of the cartridge picker assembly 19 by any of a wide range of actuator systems. By way of example, in one preferred embodiment, the thumb assembly 21 may be moved by a rack and pinion drive assembly of the type shown and described in U.S. patent application Ser. No. 09/045,558, filed Mar. 20, 1998, and entitled "Cartridge Picker Assembly with Rack Drive Thumb Actuator System," which is incorporated herein by reference for all that it discloses. Alternatively, other types of thumb actuator systems may be used.

Figure 2:
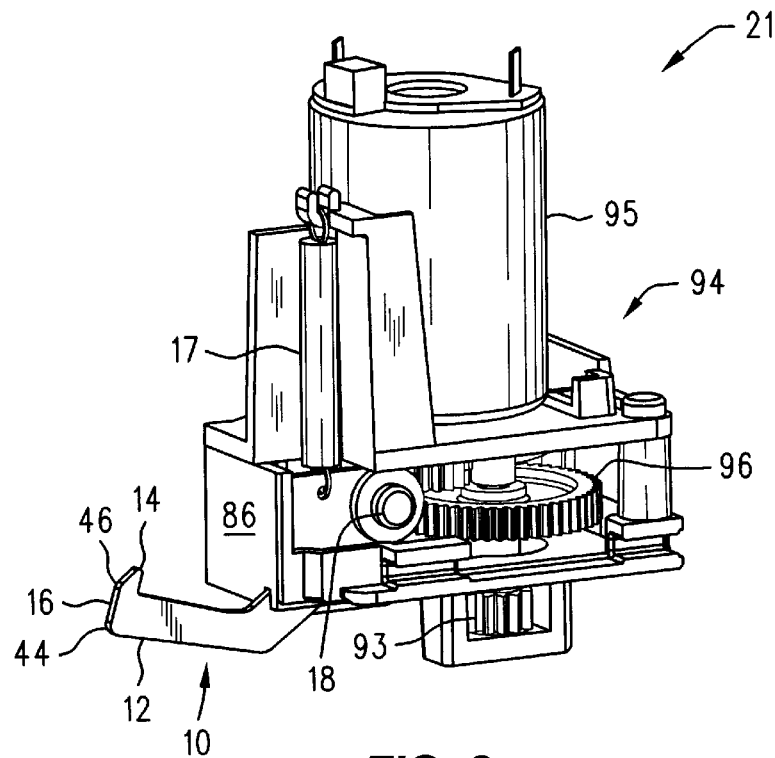
FIG. 2 is a perspective view of a thumb assembly having an automatically splaying finger assembly according to the present invention.

The rack and pinion drive system utilized in one preferred embodiment of the present invention and shown and described in U.S. patent application Ser. No. 09/045,558, referred to above, is best seen in FIGS. 2, 4, and 5 and may comprise an elongate gear rack 92 that is affixed to the first side member 78 of the picker frame assembly 76. The main body portion 86 of the thumb assembly 21 may be provided with a pinion gear 93 positioned so that it engages the gear rack 92. The pinion gear 93 is caused to rotate by a drive system 94 which, in one preferred embodiment, includes a motor 95 and a gear reduction system 96. The motor 95 may be mounted to the main body portion 86 of the thumb assembly 21 and is operatively associated with the gear reduction system 96 so that the motor 95 rotates the pinion gear 93 to extend and retract the thumb assembly 21.

The motor 95 may comprise any of a wide range of motors suitable for the intended application. In one preferred embodiment, the motor 95 comprises a permanent magnet D.C. motor, such as model no. RS-385PH, available from Mobuchi Co. of China, although other types may also be used.

The gear reduction system 96 may comprise a conventional gear reduction system utilizing a plurality of spur gears to provide a reduction ratio sufficient to allow the motor 95 to extend and retract the thumb assembly 21 at an appropriate speed and with sufficient force to withdraw and insert the data cartridge 22 into the selected cartridge receiving device. In one preferred embodiment, the gear reduction system 96 provides a reduction ratio of about 11.5:1, although other ratios may be used depending on, for example, the speed and torque characteristics of the particular motor 95 that is selected. The various spur gears comprising the gear reduction system 96 may be made from any convenient material, such as metal or plastic, suitable for the intended application. By way of example, in one preferred embodiment, the various spur gears comprising the gear reduction system 96 are made from brass and stainless steel. Alternatively, the gear reduction system could utilize other types of gears, such as worm gears, to provide the desired reduction.

The foregoing description of the data storage system 20 and related components (e.g., the cartridge picker assembly 19, thumb assembly 21, and picker positioning system 34) is provided in order to better understand one environment in which the automatically splaying picker finger 10 according to the present invention may be used. However, as was mentioned above, it should be understood that the automatically splaying picker finger 10 may be used in any of a wide range of other types of data storage systems or other similar devices having moveable internal components. Consequently, the present invention should not be regarded as limited to the particular data storage system 20 shown and described herein.

Figure 3:
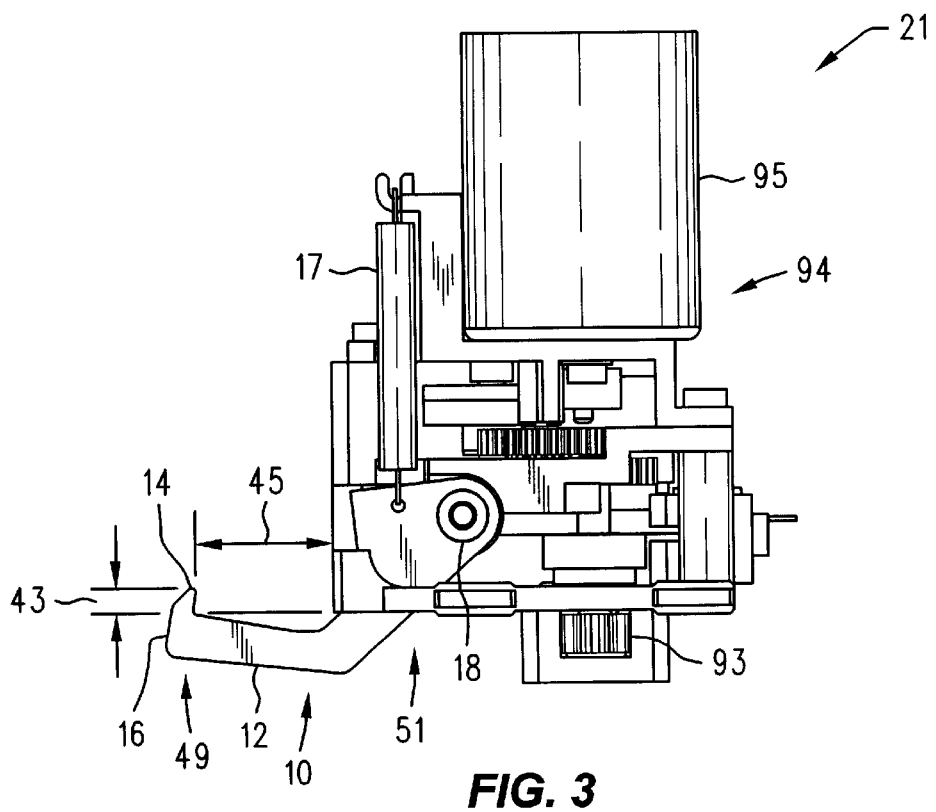
FIG. 3 is a side view of the thumb and finger assemblies of FIG. 3.

Referring now primarily to FIGS. 2 and 3, the automatically splaying picker finger 10 in one preferred embodiment may comprise a body 12 which is moveably mounted at one end 51 to a thumb assembly 21. In one preferred embodiment, the automatically splaying picker finger 10 may be mounted by a pivot pin 18 which enables the automatically splaying picker finger 10 to pivot about axis 58 (FIG. 5) between a retracted position 40 (FIG. 8a) and a splayed position 42 (FIG. 8d). Alternatively, the automatically splaying picker finger 10 may be moveably mounted to the thumb assembly 21 in any manner which enables the finger 10 to move between the retracted and splayed positions 40 and 42.

The automatically splaying picker finger 10 further comprises a face surface 16 located on the body 12 at the end 49 opposite the thumb assembly 21. The body 12 is relatively longer at the bottom 44 than at the top 46, causing the face surface 16 to be angled back at the top 46. The automatically splaying picker finger 10 also comprises a tip 14 which extends from the top 46 of the finger 10 near the end 49 to engage in a notch 23 of a data cartridge 22 (FIG. 8a). The pivot pin 18 is located above the face 16 of the automatically splaying finger assembly 10 along a Z axis to facilitate the automatic splaying action.

The various elements of the automatically splaying picker finger 10 just described may be made from any of a wide range of materials, such as metals or plastics, suitable for the intended application. For example, in one preferred embodiment, the automatically splaying picker finger 10 is made of stainless steel.

In a preferred embodiment, the automatically splaying picker finger 10 is used to engage digital linear tape (DLT) cartridges such as model number DLTtape IV, available from Quantum Co. of Milpitas, Calif. In such an application, the automatically splaying picker finger 10 may have a width 47 (FIG. 7a) between about 1 mm and about 2 mm (1.3 mm preferred). The tip 14 may have a height 43)between about 3 mm and about 4 mm (3.5 mm preferred). The tip 14 may be located a distance 45 between about 17 mm and about 20 mm (18 mm preferred) from the thumb assembly 21 when the automatically splaying picker finger 10 is in the locked position 41 (see FIG. 8e). When the automatically splaying picker finger 10 is in the retracted position 40, as shown in FIG. 8a, the angle 53 that face 16 makes with the data cartridge 22 may be between about 12 degrees and about 20 degrees (16 degrees preferred). The vertical distance between the pivot point 18 and the bottom 44 of the face 16 of the automatically splaying picker finger 10 may be between about 10 mm and about 20 mm (15 mm preferred), enabling the automatically splaying picker finger 10 to splay when the face 16 contacts the cartridge 22.

The automatically splaying picker finger 10 is biased toward the retracted position 40 by a spring 17 which is attached between the body 12 of the finger 10 and the thumb assembly 21. In a preferred embodiment, the spring 17 may comprise a metal coil spring, such as part no. E 0180-018-1370, available from Associated Spring Co. of Corry, Pa., which provides a tension of between about 1.0 newtons (n) and about 1.5 n on the automatically splaying picker finger 10. The automatically splaying picker finger 10 is prevented from moving beyond the retracted position 40 under the tension of the spring 17 by the body 86 of the thumb assembly 21. Referring now primarily to FIGS. 7a–7f and 8a–8f, the operation of the automatically splaying picker finger 10 when engaging data cartridges 22 in a storage magazine 24 is as follows.

Figure 7A:
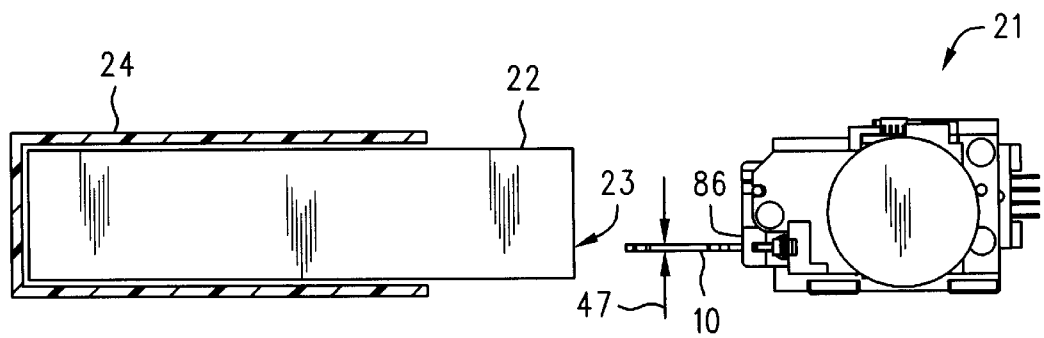
FIGS. 7(a–f) are plan views showing a thumb and finger assembly in various stages of engaging and disengaging a data cartridge in a cartridge storage rack.
Figure 7B:
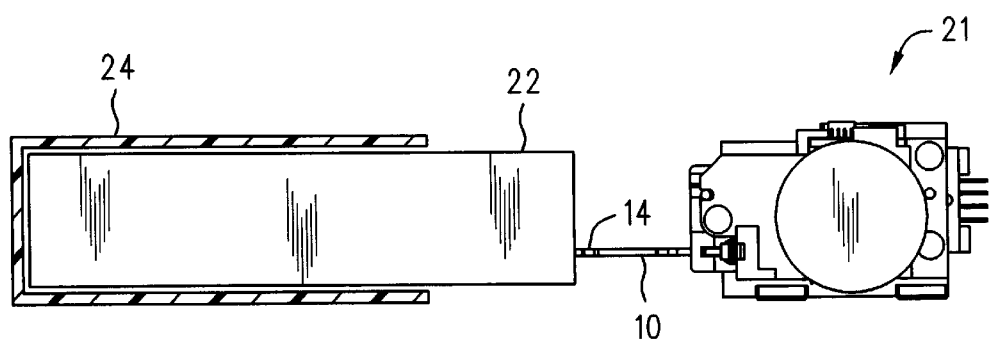
Figure 7C:
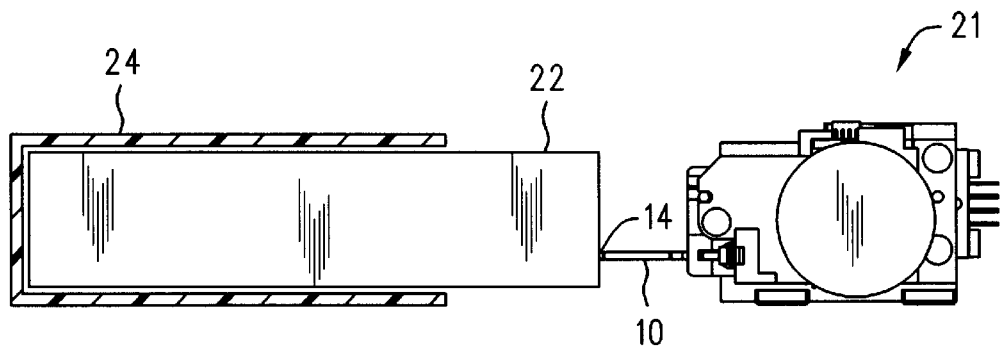
Figure 7D:
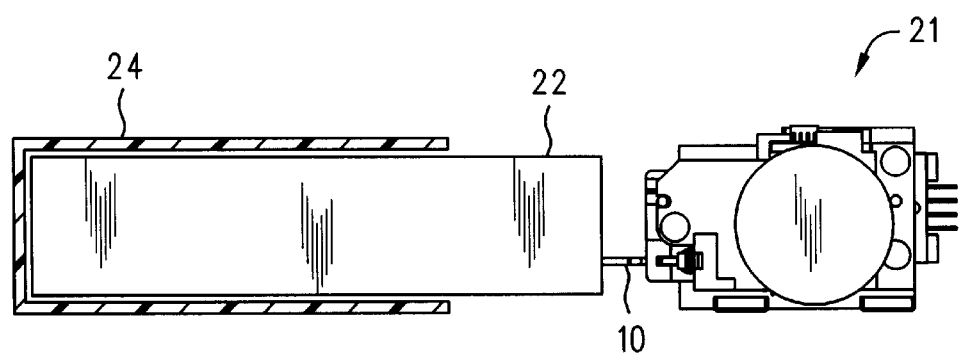
Figure 7E:
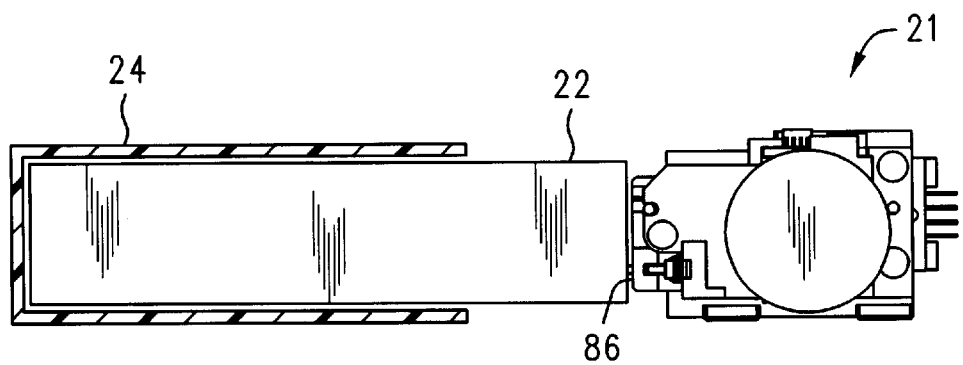

The picker 19 is first positioned along the picker positioning system 34 adjacent the cartridge 22 by the drive pinion actuator system 72 as described previously. The picker 19 is correctly positioned adjacent the data cartridge 22 when the automatically splaying picker finger 10 is adjacent the notch 23 in the cartridge 22, as shown in FIG. 7a.

To engage the data cartridge, the thumb assembly is initially retracted in the picker 19 opposite the cartridge access end 36. The automatically splaying picker finger 10 is held against the body 86 of the thumb assembly 21 in the retracted position 40 by the spring 17. The thumb assembly 21 may then be moved inside the cartridge picker assembly 19 in direction 38 toward the data cartridge 22 by the rack and pinion drive system as discussed previously. The notch 23 provided in the side 25 of the data cartridge 22 allows the tip 14 of the automatically splaying picker finger 10 to engage the cartridge 22 once the finger 10 has been properly splayed and positioned.

The thumb assembly 21 is then moved toward the data cartridge 22 until the face 16 of the automatically splaying picker finger 10 is in contact with the cartridge 22. (See FIGS. 7b and 8b) The resulting force against the angled face 16 of the automatically splaying picker finger 10, combined with the face 16 being placed lower than the pivot pin 18 along a Z axis, causes the automatically splaying picker finger 10 to pivot toward the splayed position 42. As the thumb assembly 21 moves closer to the data cartridge 22, the automatically splaying picker finger 10 pivots to the splayed position 42 against the tension of the spring 17, allowing the tip 14 of the finger 10 to clear the edge 25 of the cartridge 22. (See FIGS. 7c and 8c).

The thumb assembly 21 then continues to move toward the data cartridge 22 with the tip 14 of the automatically splaying picker finger 10 sliding along the side 25 of the cartridge 22 toward the notch 23. (See FIGS. 7d and 8d) The tension of the spring 17 holds the automatically splaying picker finger 10 in splayed position 42 against the side 25 of the data cartridge 22.

When the thumb assembly 21 has moved toward the data cartridge 22 until the tip 14 is positioned over the notch 23, the spring 17 pulls the tip 14 into the notch 23. (See FIGS. 7e and 8e) The movement of the thumb assembly 21 in direction 38 towards the cartridge access end 36 of the picker 19 may stop once the tip 14 of the automatically splaying finger assembly 10 is engaged in the notch 23 in the data cartridge 22 and the finger 10 has entered the locked position 41. The body 86 of the thumb assembly 21 is in contact or is nearly in contact with the data cartridge 22. The thumb assembly 21 and data cartridge 22 may then be retracted into the cartridge picker assembly 19 to transport the data cartridge 22 to another cartridge receiving device 24 or 26.

Figure 7F:
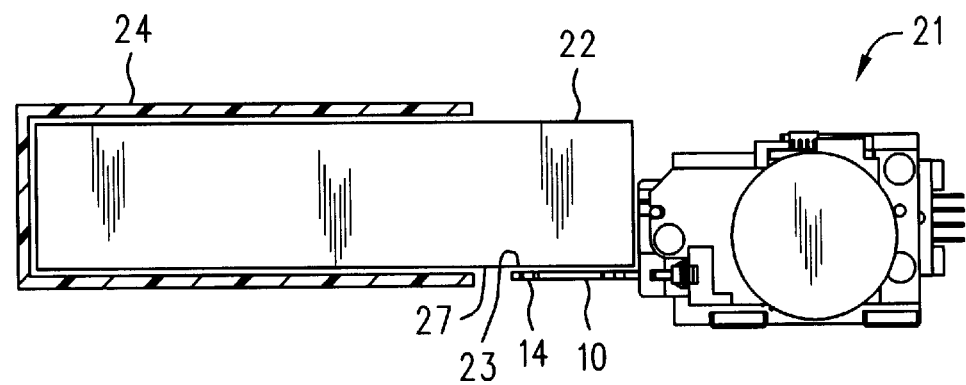
Figure 8F:
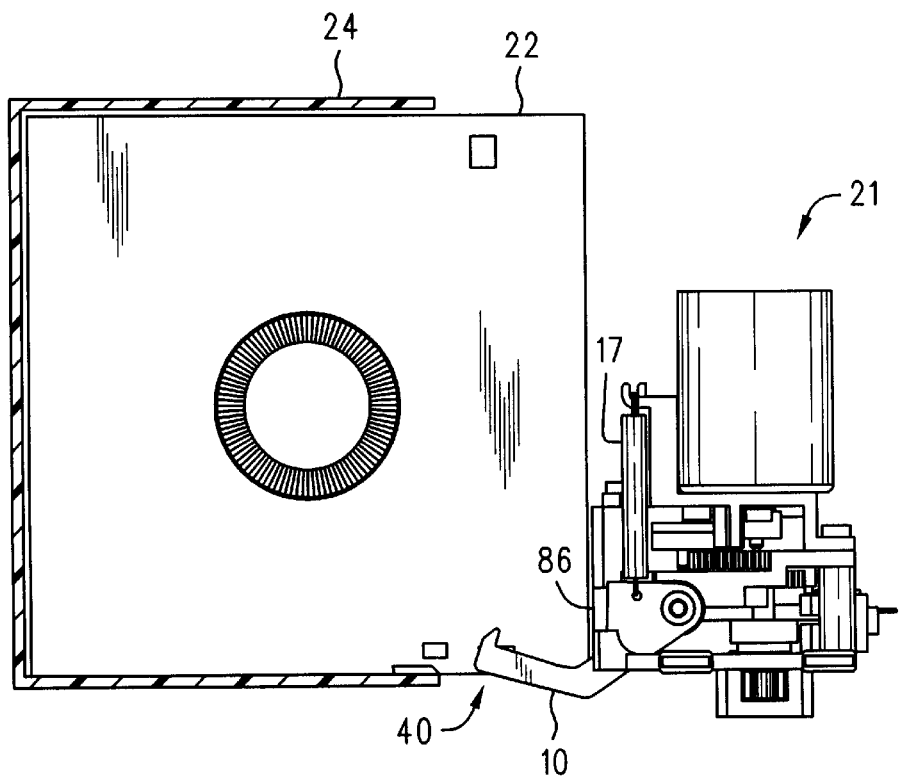

To disengage the automatically splaying picker finger 10 from the data cartridge 22 in a magazine 24, the cartridge 22 is first fully inserted into the magazine 24 as shown in FIGS. 7f and 8f. The cartridge picker assembly 19 is then moved along one of the existing degrees of freedom found in the picker drive systems (e.g., 34). For example, in one embodiment, the cartridge picker assembly 19 is moved laterally along a Y axis (FIG. 4) by the picker positioning system 34, thereby sliding the tip 14 of the automatically splaying picker finger 10 out of the notch 23. The cartridge picker assembly 19 is moved laterally along a displacement path which is substantially perpendicular to the displacement path of the thumb assembly 21 inside the picker 19. The substantially perpendicular relationship between the first displacement path of the thumb assembly 21 and the second displacement path of the cartridge picker assembly 19 exists at all locations of the cartridge picker assembly 19 along the U-shaped track 30. For example, when the cartridge picker assembly 19 is adjacent a cartridge read/write device 26 (see FIGS. 1 and 9), the lateral motion of the picker 19 along the second displacement path is along an X axis, and the motion of the thumb assembly 21 along the first displacement path in the picker 19 is along a Y axis. When the cartridge picker assembly 19 is adjacent a storage magazine 24, the lateral motion of the picker 19 along the second displacement path is along the Y axis, and the motion of the thumb assembly 21 along the first displacement path in the picker 19 is along the X axis.

In one preferred embodiment, the cartridge picker assembly 19 is moved laterally along between about 6 mm and about 8 mm (7 mm preferred) to disengage the tip 14 from the notch 23. As the tip 14 clears the bottom 27 of the data cartridge 22, the automatically splaying picker finger 10 is pulled by the spring 17 into the retracted position 40. The thumb assembly 21 and the automatically splaying picker finger 10 may then be moved into the cartridge picker assembly 19, leaving the data cartridge 22 resting in the magazine 24. Any inadvertent lateral movement of the cartridge picker assembly 19 when the data cartridge 22 is only partially protruding from the picker assembly 19 will not disengage the automatically splaying picker finger 10 from the cartridge 22, as the sides 78 and 80 of the picker assembly 19 will cause the cartridge 22 to move laterally with the picker assembly 19. As a result, the automatically splaying picker finger 10 can only be disengaged from a data cartridge 22 when the cartridge 22 is fully ejected from the picker assembly 19 into a magazine 24, simplifying error recovery.

Figure 9:
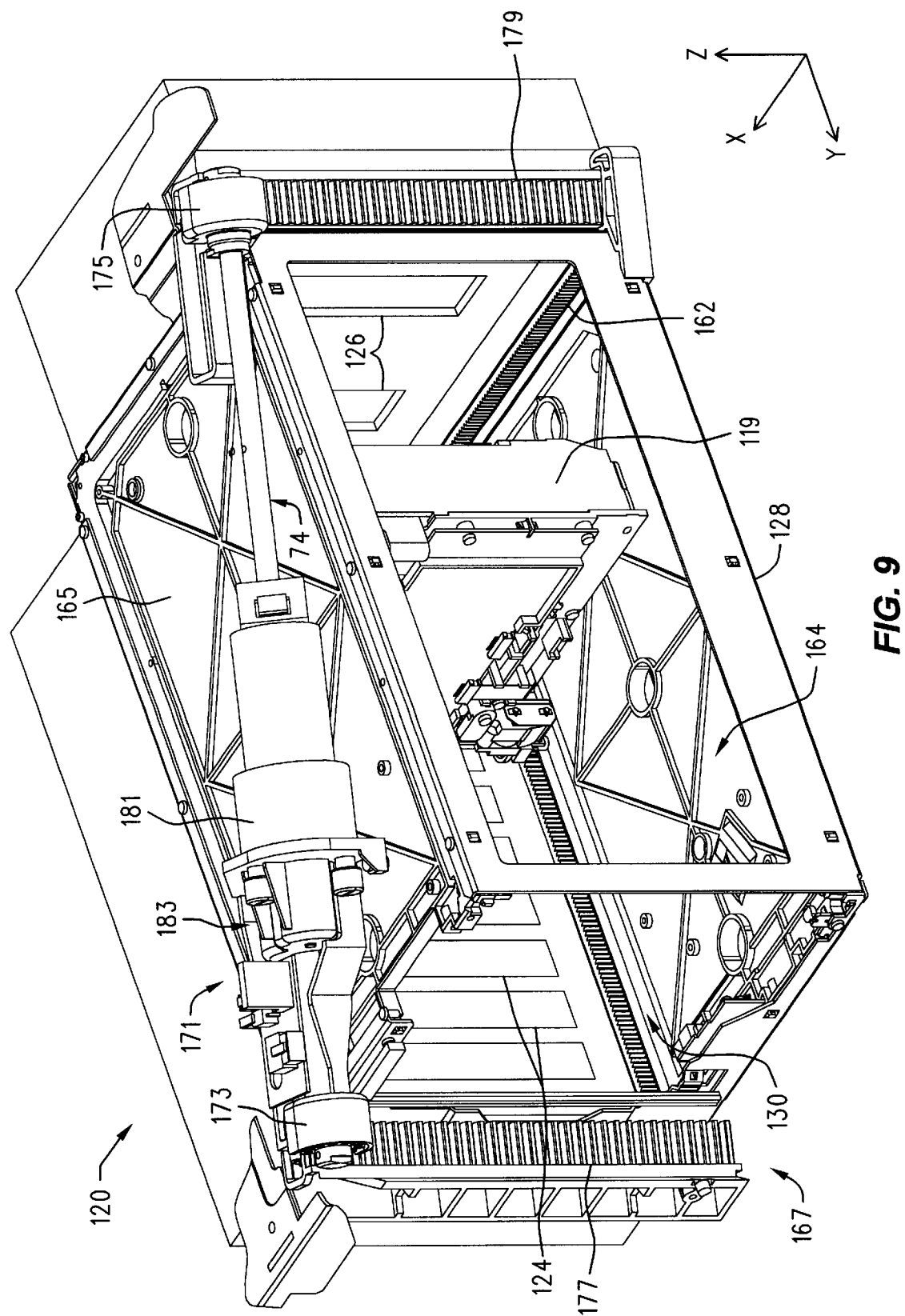
FIG. 9 is a perspective view of a cartridge picker assembly having a vertical lift system.

In another embodiment, the data storage system 120 may comprise a modular data storage system as shown and described in U.S. patent application Ser. No. 09/137,350 referred to above. Referring now primarily to FIG. 9, the frame assembly 128 comprises a lower and upper plate 164 and 165, around which a U-shaped guide track 130 and U-shaped gear rack 162 are located. A picker 119 may be positioned along the U-shaped guide track 130 as described above with respect to other embodiments. The frame assembly 128 may be moved along a Z axis by a vertical lift system 167, allowing the data storage system 120 to access cartridge receiving devices such as storage magazines 124 and cartridge read/write devices 126 which have been stacked vertically in multiple layers (not shown) along a Z axis.

The vertical lift system 167 may comprise a pinion gear assembly 169 mounted on the upper plage 165. The vertical lift system 167 may further comprise an actuator system 171 operatively associated with the pinion gear assembly 169 for vertically translating the frame 128 among the layers of cartridge receiving devices 124 and 126.

The pinion gear assembly 169 may comprise a first pinon gear 173 and a second pinion gear 175, mounted diagonally opposite one another as shown in FIG. 9. First and second gear racks 177, 179 are mounted to the frame 128, mounted diagonally opposite one another in alignment with the pinion gears 173, 175. Each pinion gear 173, 175 engages with the first and second gear rack 177, 179 respectively. The actuator system 171 is preferably comprised of a motor 181 and a gear/shaft assembly 183 to operably connect the motor 181 to the pinion gears 173, 175. As the motor 181 turns the pinion gears 173, 175, the frame 128 and the picker 119 are moved along a Z axis, providing access to the multiple layers of cartridge receiving devices 124, 126.

Figure 10A:
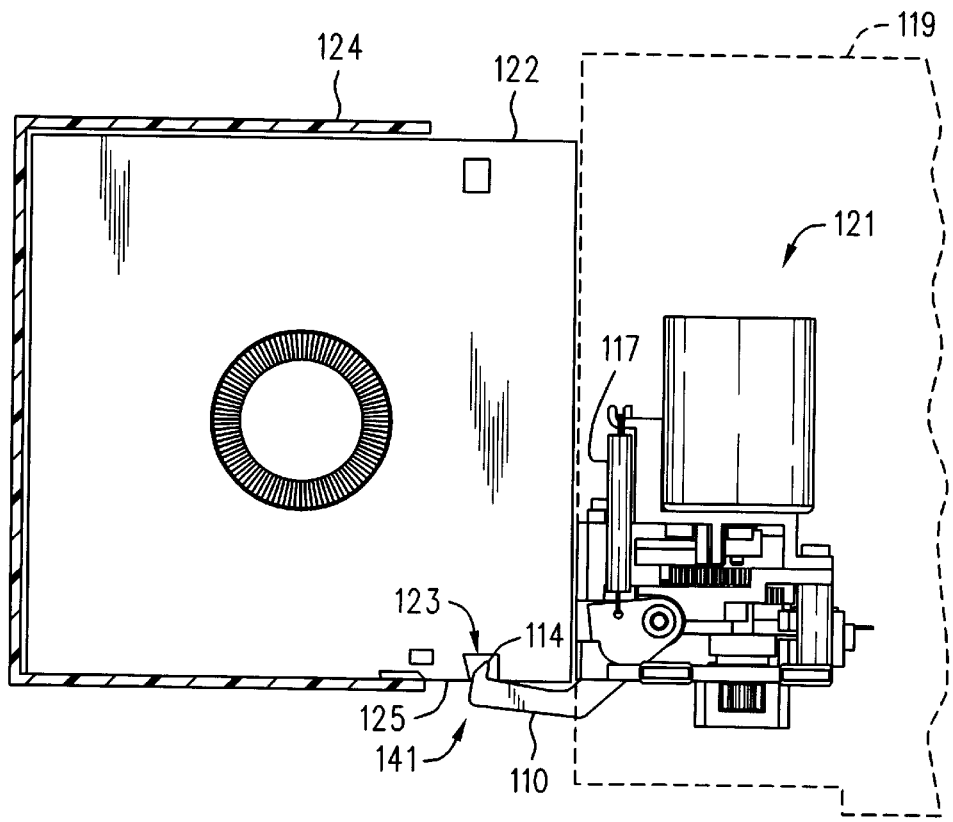
FIGS. 10(a–b) are elevation views showing a thumb and finger assembly in various stages of engaging and disengaging a data cartridge in a cartridge storage rack with a vertical lift system.
Figure 10B:
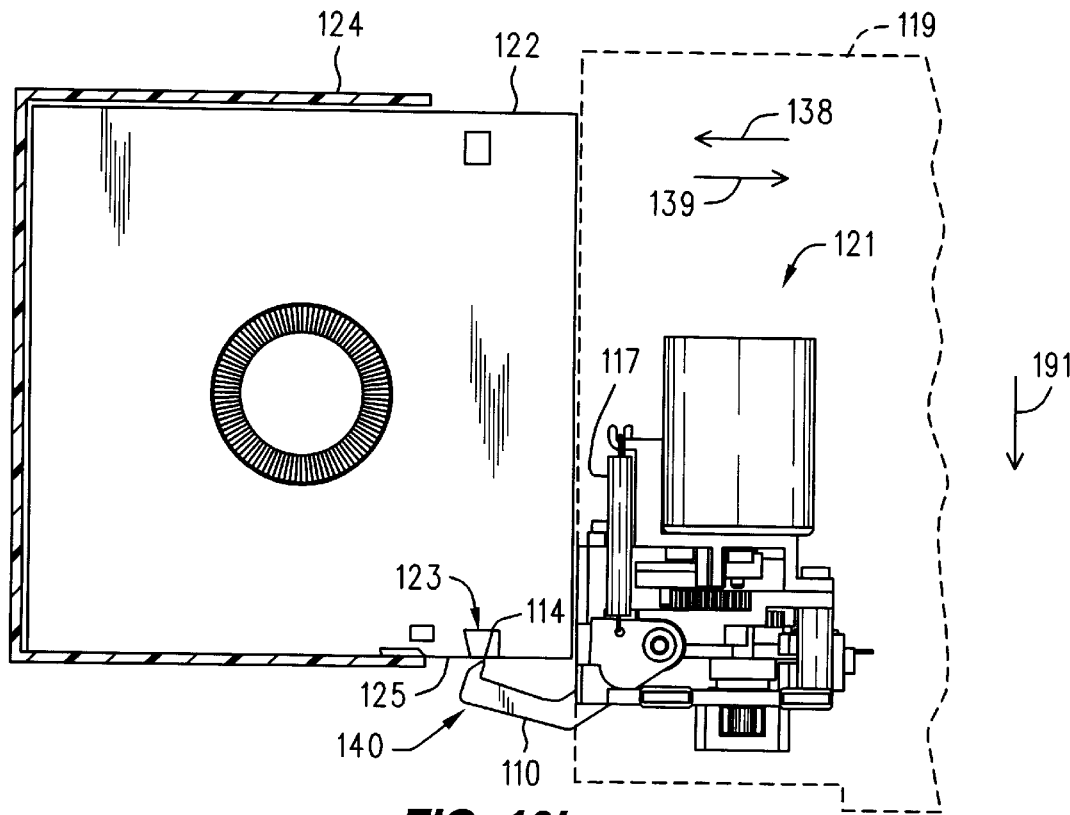

Referring now to FIGS. 9, 10a, and 10b, the cartridge picker assembly 119 in this embodiment may be moved either laterally or vertically along a Z axis to disengage the automatically splaying picker finger 110 from a data cartridge 122.

After the thumb assembly 121 is engaged with a data cartridge 122 it may be moved along a first displacement path in direction 139 into a retracted position, thereby pulling the data cartridge 122 into the cartridge picker assembly 119. To disengage the automatically splaying picker finger 110 from the data cartridge 122 in a magazine 124, the cartridge 122 is first moved to the magazine 124 and inserted. To position the cartridge 122 adjacent the magazine 124, the cartridge picker assembly 119 is first moved along a second displacement path both laterally by the picker positioning system (e.g., 34) and vertically by the vertical lift system 167 until the cartridge 122 is properly positioned. The second displacement path traveled by the cartridge picker assembly 119 is substantially perpendicular to the first displacement path of the thumb assembly 121, as discussed above.

The thumb assembly 121 is then moved along the first displacement path in direction 138 so that the body 186 of the thumb assembly 121 pushes the data cartridge 122 into the magazine 124, as shown in FIG. 10a.

With the data cartridge 122 seated in the magazine 124 and the thumb assembly 121 still in the extended position, the cartridge picker assembly 119 may be moved along the second displacement path to disengage the automatically splaying picker finger 110. In this example, the cartridge picker assembly 119 is moved down along a Z axis in direction 191 by the vertical lift system 167. As the cartridge picker assembly 119 is moved down, the data cartridge 122 remains in the magazine 124 and the tip 114 of the automatically splaying picker finger 110 is pulled out of the notch 123 in the side 125 of the data cartridge 122. The automatically splaying picker finger 110 is pulled from the locked position 141 to the retracted position 140 by the spring 117. The thumb assembly 121 may then be moved along the first displacement path into the retracted position inside the cartridge picker assembly 119, and the cartridge picker assembly 119 may be moved to another data cartridge.

Referring now primarily to FIGS. 11a–11f, the operation of the automatically splaying picker finger 10 when engaging a cartridge 22 in a cartridge read/write device 26 will be discussed in more detail.

A data cartridge 22 may be fully engaged in the housing 50 of a cartridge read/write device 26, as shown in FIG. 11a. In one preferred embodiment, the housing 50 is relatively longer than a cartridge storage magazine 24, so that when a data cartridge 22 is fully inserted in the read/write device 26, the notch 23 in the cartridge 22 is covered by the housing 50.

Figure 11B:
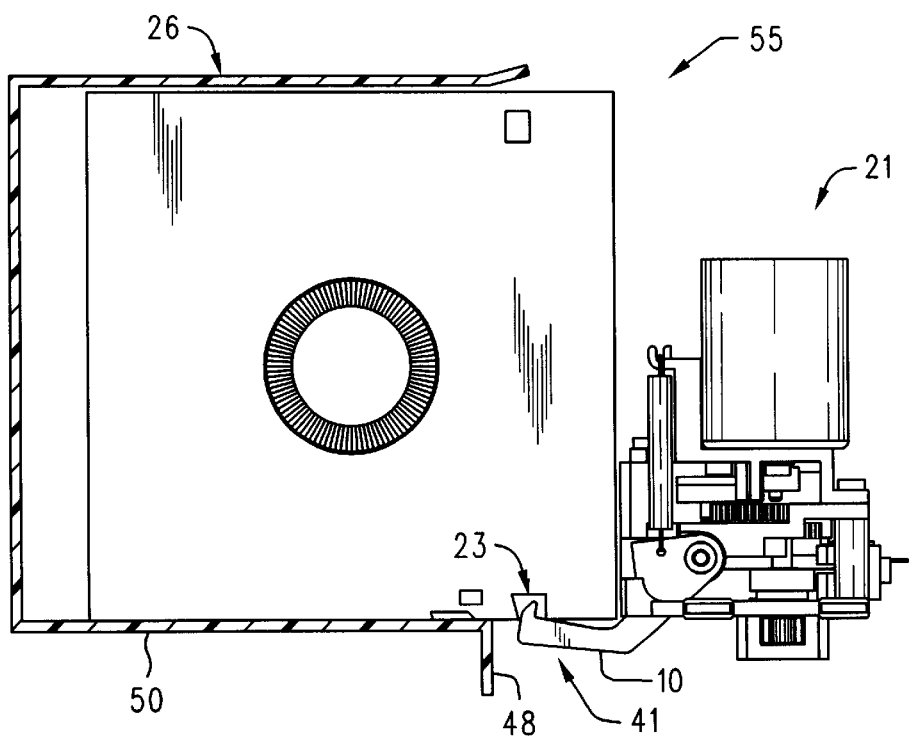

To engage the automatically splaying picker finger 10 with the data cartridge 22, the cartridge read/write device 26 first ejects the cartridge 22 to an ejected position 55, as shown in FIG. 11b, such that the notch 23 in the cartridge 22 is exposed. In one preferred embodiment, the ejected position 55 is about 12 mm from the fully inserted position.

The thumb assembly 21 (see FIG. 11b) then moves toward the data cartridge 22 as described above with respect to FIGS. 7a–7e and 8a–8e, and the automatically splaying picker finger 10 moves into the locked position 41 with the tip 14 engaged in the notch 23. The thumb assembly 21 and data cartridge 22 may then be retracted into the cartridge picker assembly 19 to be transported to another cartridge receiving device 24 or 26.

Figure 11C:
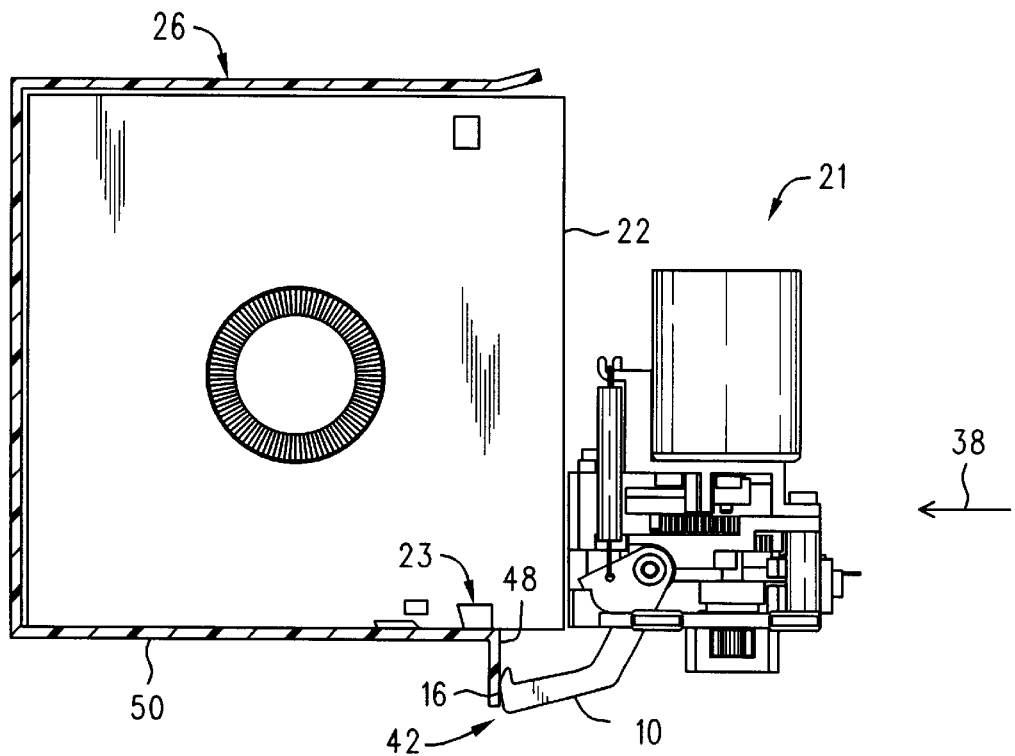
Figure 11D:
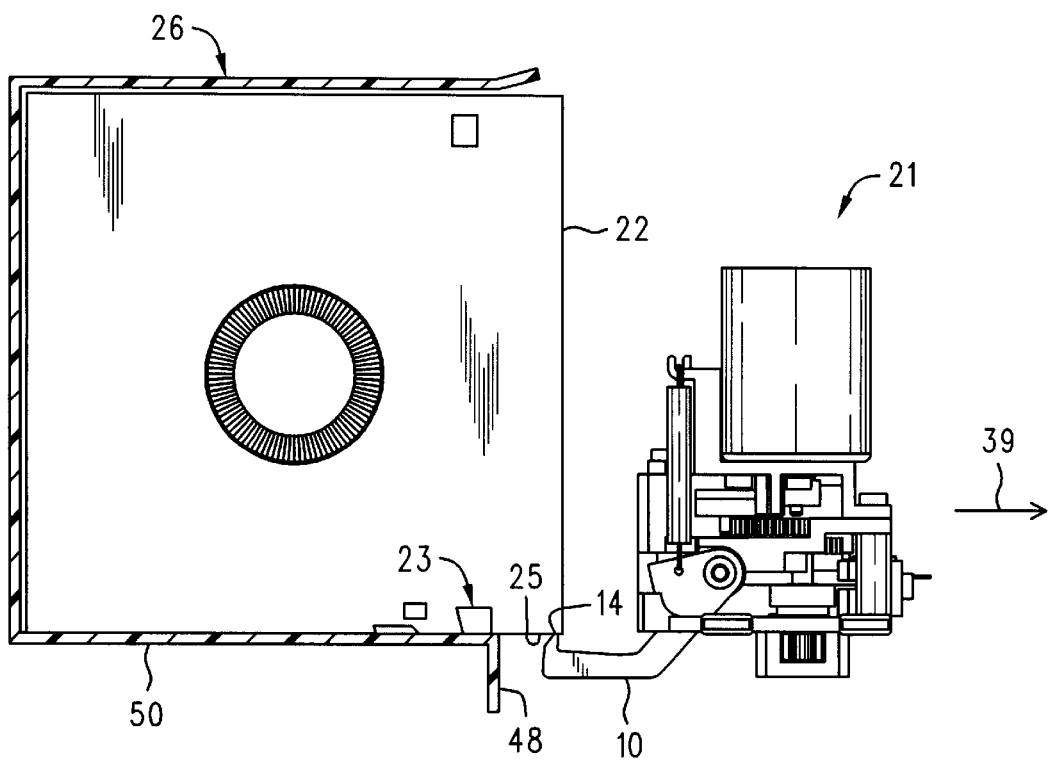

The thumb and finger assemblies 21 and 10 may also disengage from a data cartridge 22 after inserting the cartridge 22 into a cartridge read/write device 26, as shown in FIGS. 11c and 11d. The cartridge picker assembly 19 carrying the data cartridge 22 is first positioned adjacent the cartridge read/write device 26 as described previously. The thumb assembly 21 with the automatically splaying picker finger 10 engaged to the data cartridge 22 is then moved out of the cartridge picker assembly 19 in direction 38 toward the cartridge read/write device 26.

As the data cartridge 22 nears the fully inserted position, the face 16 of the automatically splaying picker finger 10 contacts a bezel 48 on the housing 50 of the cartridge read/write device 26. The angled face 16 is thereby caused to pivot down into the splayed position 42, disengaging the tip 14 from the notch 23. The thumb assembly 21 continues to push the data cartridge 22 into the cartridge read/write device 26 until it is fully inserted and the notch 23 is covered by the housing 50. The thumb assembly 21 may then be retracted into the cartridge picker assembly 19 with the tip 14 of the automatically splaying picker finger 10 sliding along the edge 25 of the data cartridge 22.

Alternatively, the drive housing 50 of a cartridge read/write device 26 may be formed without a bezel 48 and with a more shallow cartridge cavity such as the magazine 24 described above. In this case, engagement and disengagement of a data cartridge 22 in a cartridge read/write device 26 would operate in the same fashion as with respect to a magazine 24.

It is contemplated that the inventive concepts herein described may be variously otherwise embodied and it is intended that the appended claims be construed to include alternative embodiments of the invention except insofar as limited by the prior art.

What is claimed is:

1. A cartridge picker for selectively engaging and disengaging a cartridge, comprising:

a thumb assembly mounted to said cartridge picker so that said thumb assembly is moveable along a first displacement path between an extended position and a retracted position;

a finger having a cartridge engagement end and a mounting end, the mounting end being mounted to said thumb assembly, said finger being moveable between a retracted position and a splayed position, so that moving said cartridge engagement end of said finger against a cartridge causes said finger to move into the splayed position; and a cartridge picker positioning system operatively associated with said cartridge picker, said cartridge picker positioning system moving said cartridge picker between a first position and a second position along a second displacement path that is substantially perpendicular to the first displacement path so that said finger disengages the cartridge when said thumb assembly is in the extended position and when the cartridge picker is moved to the second position.

2. The cartridge picker of claim 1, wherein said finger is aligned with the cartridge when said cartridge picker is located in the first position.

3. The cartridge picker of claim 2, wherein said finger is not aligned with the cartridge when said cartridge picker is located in the second position, so that said finger is located alongside the cartridge when said thumb assembly is in the extended position and the cartridge picker is in the second position.

4. The cartridge picker of claim 1, wherein said finger is pivotally mounted to said thumb assembly.

5. The cartridge picker of claim 1, wherein said finger comprises a hooked tip at the cartridge engagement end.

6. The cartridge picker of claim 1, further comprising a spring attached between said thumb assembly and said finger so that said finger is pulled toward the retracted position.

7. The cartridge picker of claim 1, wherein the mounting end of said finger is higher along a Z axis than the cartridge engagement end of said finger.

8. The cartridge picker of claim 7, wherein the mounting end of said finger is between about 10 mm and about 20 mm higher along a Z axis than the cartridge engagement end of said finger.

9. The cartridge picker of claim 1, wherein the first position is between about 6 mm and about 8 mm from the second position along the second displacement path.

10. The cartridge picker of claim 1, wherein the cartridge engagement end of said finger comprises an angled face.

11. The cartridge picker of claim 10, wherein the angled face of said finger is angled between about 12 degrees and about 20 degrees from a Z axis.

12. A cartridge picker for selectively engaging and disengaging a cartridge, comprising:

a thumb assembly mounted to said cartridge picker so that said thumb assembly is moveable along a horizontal displacement path between an extended position and a retracted position;

a finger having a cartridge engagement end and a mounting end, the mounting end being mounted to said thumb assembly, said finger being moveable between a retracted position and a splayed position, so that moving said cartridge engagement end of said finger against a cartridge causes said finger to move into the splayed position; and a cartridge picker positioning system operatively associated with said cartridge picker, said cartridge picker positioning system moving said cartridge picker between a first vertical position and a second vertical position along a vertical displacement path so that said finger disengages the cartridge when said thumb assembly is in the extended position and when the cartridge picker is moved to the second vertical position.

13. The cartridge picker of claim 12, wherein said finger is aligned with the cartridge when said cartridge picker is located in the first vertical position and said finger is not aligned when said cartridge picker is located in the second vertical position, so that said finger is located under the cartridge when said thumb assembly is in the extended position and the cartridge picker is in the second vertical position.

14. A method for engaging a data cartridge with a cartridge picker, comprising:

providing a cartridge picker comprising a thumb assembly moveable along a displacement path between an extended position and a retracted position and a finger mounted to the thumb assembly so that the finger may be moved between a retracted position and a splayed position;

positioning the cartridge picker adjacent the data cartridge;

moving the thumb assembly along the displacement path toward the cartridge, causing the finger to move to the splayed position by pressing the finger against the data cartridge; and continuing to move the thumb assembly along the displacement path toward the cartridge until the finger engages a notch in the cartridge.

* * * * *